(12) United States Patent
Hritz

(10) Patent No.: US 9,951,763 B2
(45) Date of Patent: Apr. 24, 2018

(54) COMPRESSOR COOLED BY A TEMPERATURE CONTROLLED FAN

(71) Applicant: Westinghouse Air Brake Technologies Corporation, Wilmerding, PA (US)

(72) Inventor: Jeffrey Hritz, Jefferson Hills, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 276 days.

(21) Appl. No.: 14/704,586

(22) Filed: May 5, 2015

(65) Prior Publication Data

US 2015/0322934 A1 Nov. 12, 2015

Related U.S. Application Data

(60) Provisional application No. 61/991,193, filed on May 9, 2014.

(51) Int. Cl.
*F04B 39/06* (2006.01)
*F04B 25/00* (2006.01)

(52) U.S. Cl.
CPC ......... *F04B 39/066* (2013.01); *F04B 25/005* (2013.01); *F04B 39/06* (2013.01)

(58) Field of Classification Search
CPC ...... F04B 39/066; F04B 25/005; F04B 39/06; F04B 25/00; F04B 49/035; F25B 47/006; F25B 2600/11; F25B 2700/2115; F25B 2700/21151; F25B 2700/21152; F25B 31/006; F25B 31/008; F25B 2400/072; G05D 23/19; G05D 23/1902; G05D 23/1904

USPC ............... 417/243, 228, 252, 201; 62/186
See application file for complete search history.

(56) References Cited

U.S. PATENT DOCUMENTS

| | | | | |
|---|---|---|---|---|
| 3,216,648 A | * | 11/1965 | Ford | F04B 25/00 417/203 |
| 3,759,058 A | * | 9/1973 | Jacobs | B60H 1/0045 62/228.1 |
| 4,362,462 A | * | 12/1982 | Blotenberg | F04D 29/5833 415/1 |
| 4,889,180 A | * | 12/1989 | Sloan | F25C 3/04 165/263 |
| 4,915,594 A | | 4/1990 | Lammers | |
| 5,052,186 A | * | 10/1991 | Dudley | F25B 49/022 62/215 |

(Continued)

*Primary Examiner* — Dominick L Plakkoottam
*Assistant Examiner* — Benjamin Doyle
(74) *Attorney, Agent, or Firm* — The Webb Law Firm

(57) ABSTRACT

A multistage compressor includes a first compression stage and a second compression stage connected in series with the first compression stage that receives and further compresses gas from the first stage. A first cooling element is connected between the first compression stage and the second compression stage. A second cooling element is connected to a discharge of the second compression stage. The multistage compressor further includes a cooling unit for providing cooling airflow to the first and second cooling elements. The cooling unit includes a fan and a first temperature sensor that determines a temperature of gas discharged from the first cooling element. The cooling unit is configured to increase or decrease a fan speed based on a temperature determined by the first temperature sensor. A method of controlling fan speed of a cooling fan of a compressor is also provided.

22 Claims, 4 Drawing Sheets

(56) References Cited

U.S. PATENT DOCUMENTS

| | | | | |
|---|---|---|---|---|
| 5,106,270 A * | 4/1992 | Goettel | ................ | F04B 39/066 417/243 |
| 5,275,538 A | 1/1994 | Paliwoda et al. | | |
| 5,318,151 A * | 6/1994 | Hood | ................ | F04C 29/021 184/104.1 |
| 5,818,131 A * | 10/1998 | Zhang | ................ | B63H 11/08 128/DIG. 3 |
| 5,885,060 A * | 3/1999 | Cunkelman | ............ | F04B 25/00 417/243 |
| 5,894,881 A * | 4/1999 | Wagner | ................ | B61C 17/00 165/300 |
| 6,082,971 A * | 7/2000 | Gunn | ................ | F04B 39/066 417/32 |
| 6,203,285 B1 * | 3/2001 | Wagner | ................ | F04B 25/00 417/243 |
| 6,283,725 B1 * | 9/2001 | Goettel | ................ | F01B 19/02 123/292 |
| 6,305,313 B1 * | 10/2001 | Cunkelman | ............ | G01K 11/06 116/217 |
| 6,638,029 B2 * | 10/2003 | Kharsa | ................ | F04B 25/00 417/250 |
| 7,033,144 B2 | 4/2006 | Yoshimura et al. | | |
| 8,128,379 B2 * | 3/2012 | Hritz | ................ | F04B 53/08 165/287 |
| 9,121,416 B2 * | 9/2015 | Stock | ................ | F04D 25/08 |
| 9,291,409 B1 * | 3/2016 | Heath | ................ | F28F 27/00 |
| 2002/0157404 A1 * | 10/2002 | Pauwels | ................ | F04B 39/06 62/84 |
| 2003/0228229 A1 * | 12/2003 | Yoshimura | ............ | F04C 18/16 417/199.1 |
| 2004/0163613 A1 * | 8/2004 | Bystedt | ................ | B60T 17/002 123/41.31 |
| 2006/0062678 A1 * | 3/2006 | Furuta | ................ | E02F 9/226 417/423.1 |
| 2009/0311114 A1 * | 12/2009 | Schulz | ................ | F04B 9/02 417/254 |
| 2010/0122808 A1 * | 5/2010 | Hritz | ................ | F04B 53/08 165/287 |
| 2011/0203538 A1 * | 8/2011 | Menier | ............ | B60H 1/00828 123/41.11 |
| 2012/0192710 A1 | 8/2012 | Moore et al. | | |
| 2013/0129480 A1 * | 5/2013 | Hirata | ................ | F04B 39/066 415/116 |
| 2013/0294936 A1 * | 11/2013 | Worden | ................ | F04B 25/00 417/53 |
| 2013/0336810 A1 * | 12/2013 | Worden | ................ | F04B 49/00 417/53 |
| 2014/0271258 A1 * | 9/2014 | Vezil | ................ | F04B 49/22 417/53 |
| 2015/0030468 A1 * | 1/2015 | Martens | ............ | F04B 39/0207 417/53 |
| 2015/0075369 A1 | 3/2015 | Kapadia et al. | | |
| 2015/0078888 A1 * | 3/2015 | Golshany | ................ | F02C 7/36 415/123 |
| 2015/0285264 A1 * | 10/2015 | Kennedy | ................ | B61C 5/02 417/53 |
| 2015/0322934 A1 * | 11/2015 | Hritz | ................ | F04B 39/066 417/53 |

\* cited by examiner

COMPRESSOR COOLED BY A TEMPERATURE CONTROLLED FAN

CROSS REFERENCE TO RELATED APPLICATION

This application claims priority to U.S. Provisional Patent Application No. 61/991,193 filed on May 9, 2014, the disclosure of which is hereby incorporated by reference in its entirety.

BACKGROUND OF THE INVENTION

Field of the Invention

The present disclosure relates to a multistage compressor and, more particularly, to a multistage compressor with a cooling unit including a cooling fan controlled by temperature sensors located between compression stages of the multistage compressor.

Description of Related Art

Mechanical single stage, air compressors are well known in the art. Such single stage compressors include a driving mechanism for compressing air contained within a compression chamber, such as piston and cylinder, centrifugal, axial-flow, or turbine type mechanism. The simplest and most common mechanisms in use is the piston and cylinder arrangement. In this type, a gas, such as air, is admitted via a valve into the cylinder where a reciprocating piston in the cylinder compresses the gas and displaces the compressed gas to a conduit or reservoir from which it can be taken for use as may be required. For example, compressed gas may be used for operating brakes of a rail vehicle.

Multiple stage air compressors are also known. Such multiple stage compressors are utilized to compress gasses to pressures which are higher than can normally be achieved with a single stage compressor. These multiple stage compressors normally include a plurality of mechanical single stage compressors connected to one another in series, such that compressed gas is passed from one stage to the next. The pressure of the gas increases at each succeeding stage. In a piston and cylinder type compressor, air or gas, at ambient pressure and temperature, is admitted into the cylinder of the first compressor stage where a first reciprocating piston compresses the gas and displaces it to the second stage, and so on through all the stages in the system. Each stage further compresses the previously compressed gas until the final desired pressure is achieved.

Multistage compressors generally include cooling steps of the compressed gas between at least some of the various compressor stages. Cooling the compressed gas between stages ensures that the overall compression is more isothermal than adiabatic. More specifically, because of the ideal gas law, (PV=nRT), each compression stage of the gas will cause an increase in pressure, P, as intended, and will also cause a directly proportional increase in the temperature of the fluid.

While this increase in temperature of the gas is not normally a problem in a typical single stage compressor where a defined volume of air is compressed only one time, the relatively high air pressures obtained in most multistage compressors can result in the compressed air having excessive and problematical temperatures. Accordingly, it is necessary to perform the intermediate cooling step of the compressed gas between the various compression stages. The intermediate cooling step can be performed by a cooling element, referred to as an intercooler, such as a radiator or heat exchanger.

Water exists as vapor in practically any ambient air to be compressed in a conventional compressor. Water content is quantified as the relative humidity of the air. The relative humidity of the air, expressed as a percent value, is the ratio of (a) the water vapor actually present in the air, in comparison to (b) the saturation vapor pressure at the temperature in question. Since the saturation vapor pressure is a function of the air temperature, as the temperature increases for any given sample of air, the saturation vapor pressure increases, and, accordingly, the relative humidity decreases. When the air is compressed by an air compressor with little or no externally caused change in temperature, the temperature of the compressed air is increased in proportion to the increase in pressure. Because the saturation vapor pressure of water is dependent on the temperature of the air, it follows that when the temperature is increased the saturation vapor pressure is also increased.

Thereafter, if the compressed air is cooled with an intercooler, it is not uncommon for the water vapor pressure in the compressed air to exceed the saturation vapor pressure for the compressed air. Therefore, it is not uncommon for this phenomenon to cause significant amounts of water to be condensed as liquid within the system. Free water within the compressor causes a variety of problems, such as oxidation (e.g., rusting) of compressor components, and more significantly, causes condensed water to be admixed into the lubricating oil within the compressor sump. Such dilution of the lubricating oil in the compressor with water can seriously impair the normal operation of the compressor, as well as reduce its overall useful life. For example, rust formation can cause valve leakage. Additionally, water traveling at high velocities through valves of the compressor can cause wear, leakage, and eventual failure of valve components. Therefore, it is desirable to substantially minimize or eliminate the condensation of such water within any compressor.

Multistage compressors often also include an additional cooling step, referred to as an aftercooler. In the aftercooler, discharge from the final compression stage is cooled to a temperature close to ambient temperature before it exits the compressor. The aftercooler functions to decrease the temperature of the compressed air to allow a maximum amount of entrapped water vapor to condense to water form before being discharged from the compressor. The water can be collected and drained from the compressor. Optionally, the compressed and cooled air may be passed through an inline air dryer to remove remaining water vapor therefrom. Cooling the air prior to passing it through the inline air dryer has been found to improve the operation and efficiency of the air dryer, which also improves downstream air quality.

However, in ambient conditions that are below freezing, the water condensation within the aftercooler can freeze within the aftercooler or before it is removed from the compressor through the drain. Airline freeze can block fluid from exiting the compressor and render the compressor unusable. Blockages within the air line can also cause unsafe over-pressurization within systems that are not properly protected by safety valves. Therefore, it is highly desirable to maintain the temperature of the discharged air above freezing, which also reduces water condensation at the discharge of the aftercooler.

In order to prevent condensation and/or freezing of condensed fluid within the compressor, various arrangements or mechanisms for controlling the temperature of gas passing through a cooling element, such as an intercooler or aftercooler, are known. For example, U.S. Pat. No. 5,885,060 to Cunkelman et al. (hereinafter "the Cunkelman patent") and U.S. Pat. No. 6,283,725 to Goettel et al. (hereinafter "the Goettel patent"), each of which are incorporated by reference herein in its entirety, disclose multistage compressors that use various bypass arrangements to allow a portion of the compressed gas to bypass the intercooler or aftercooler. The bypassed gas is mixed with gas cooled by the intercooler or aftercooler at the intercooler or aftercooler discharge to warm the cooled gas. The bypass arrangement may be optimized to ensure that the mixed gas is maintained within a specific temperature range that is optimal for compressor operation. In that case, the arrangement may include a controller and a switch or valve for ensuring that the correct amount of gas enters the bypass to ensure that the desired temperature is maintained at the intercooler or aftercooler discharge.

More specifically, the Cunkelman patent discloses a thermostatically controlled intercooler system that prevents condensation of a gas within the compressor. The system includes a three-way valve controlled by a controller unit. The controller unit operates the three-way valve to allow cooled air, un-cooled air, or a combination thereof to pass to a second or subsequent compression stage. The valve may include a built-in temperature control that operates so that air at the cooler discharge is maintained within a desired temperature range. The Goettle patent discloses an aftercooler bypass arrangement in which uncooled air is directed around the aftercooler and mixed with cooled air at a discharge of the cooler. The bypass arrangement includes a three-way check valve, as described above. The value is controlled so that the temperature of air at the aftercooler discharge is maintained at or above freezing temperature for the fluid being compressed.

However, such air bypass and mixing arrangements are needlessly complex, requiring dedicated conduits or fluid channels for directing air flow around the cooling elements. Furthermore, since most multistage compressors include both an intercooler and an aftercooler, it is generally necessary to include dedicated and independent bypass arrangements for each cooling element used in the compressor. Accordingly, there is a need for a simpler system or method for controlling air temperature between compression stages of a multistage compressor which controls the temperature at a discharge of the intercooler and the aftercooler using the same device or mechanism. Furthermore, the arrangement or system should be able to integrate with existing elements of a compressor system. The multistage compressor and method described hereinafter is intended to address and improve these issues.

SUMMARY OF THE INVENTION

In view of the foregoing, a multistage compressor is provided herein. The compressor includes a cooling unit with a cooling fan. The cooling unit is configured to cool gas between compression stages of the multistage compressor to prevent damage caused by condensation or elevated temperatures in the compressor. The cooling unit is also configured to prevent cooled gas from condensing and freezing following a final compression stage.

More particularly a multistage compressor includes a first compression stage for compressing a received gas and a second compression stage connected in series with the first compression stage that receives and further compresses the gas from the first stage. A first cooling element is connected between the first compression stage and the second compression stage for cooling the gas following compression in the first stage. A second cooling element is connected to a discharge of the second compression stage for cooling the gas following compression in the second compression stage. The multistage compressor further includes a cooling unit for providing cooling airflow to the first and second cooling elements. The cooling unit includes a fan configured to provide cooling air to the first cooling element and the second cooling element, a first temperature sensor that determines a temperature of gas discharged from the first cooling element, and a second temperature sensor that determines a temperature of gas discharged from the second cooling element. The cooling unit is configured to increase or decrease a fan speed based on a temperature determined by the first temperature sensor and/or the second temperature sensor.

According to another aspect of the disclosure, a method for controlling fan speed of a cooling fan of a multistage compressor is provided. The method includes the steps of providing a gas to a first compression stage of a multistage compressor to produce a compressed gas; providing the compressed gas to a first cooling element; and determining a discharge temperature of the gas after the gas passes through the first cooling element. The method further includes the step of increasing a fan speed of a cooling fan that provides cooling air to the first cooling element when the discharge temperature exceeds a minimum optimal operating temperature.

The foregoing and other features and characteristics, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Some of the advantages and features of the preferred embodiments of the invention have been summarized hereinabove. These embodiments, along with other potential embodiments of the device, will become apparent to those skilled in the art when referencing the following drawings in conjunction with the detailed descriptions as they relate to the figures.

DETAILED DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description.

However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
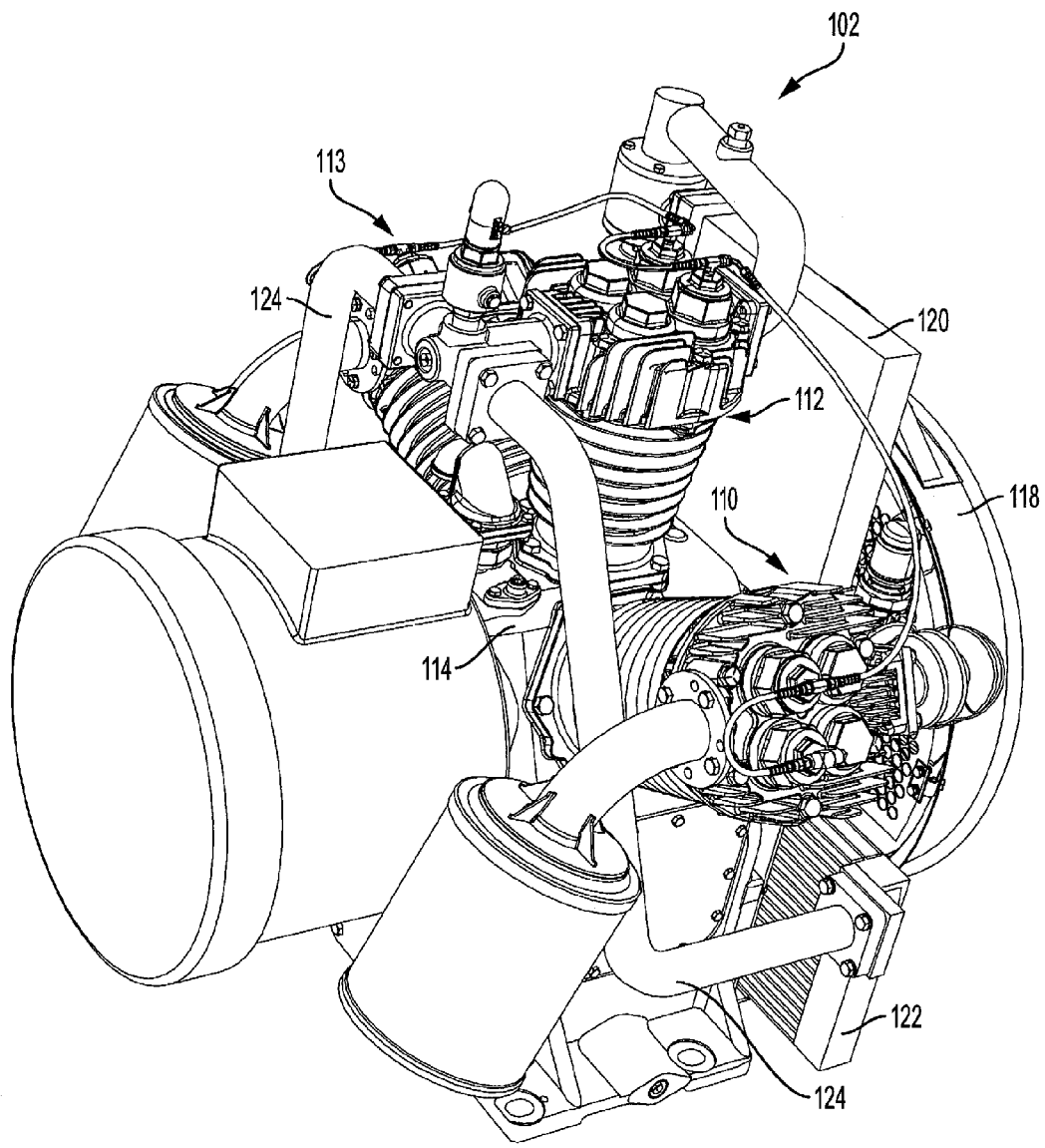
FIG. 1 is a perspective view of an air compressor for railway vehicles shown in association with a cooling fan, as is known in the prior art.

With reference to FIG. 1, a multistage air compressor 102, as is known in the prior art, is illustrated. The compressor 102 includes multiple compression cylinders, namely a first piston cylinder 110, a second piston cylinder 112, and a third compression cylinder 113. The piston cylinders 110, 112, 113 are supported by a compressor housing 114 or crankcase and are each driven by a crankshaft assembly disposed within the compressor housing 114 and rotatably supported by the housing 114. The compressor 102 may use various oil lubrication mechanisms to prevent mechanical components, such as the crankshaft assembly, from overheating during use. In operation, a piston (not shown) in the first piston cylinder 110 operates in a reciprocating movement generated via the crankshaft assembly. A gas, such as air, within the compressor housing 114 is drawn into the first piston cylinder 110 as a result of the downward movement of the piston and is compressed during the upward movement of the piston. A valve associated with the first cylinder 110 opens during upward movement of the piston, whereby gas in the first cylinder 110 is guided out of the first cylinder 110 and is fed to an inlet portion associated with the second piston cylinder 112. The gas undergoes a second compression stage in the second piston cylinder 112.

The multistage compressor 102 illustrated in FIG. 1 may be associated with a cooling unit including cooling elements, namely an intercooler 120 and an aftercooler 122, as well as a cooling fan 118 for providing cooling air to the cooling elements. Compressed gas may be passed through the intercooler 120 or aftercooler 122 for cooling following a compression stage to prevent the temperature of the compressed gas from exceeding a maximum optimal operating temperature. The compressor 102 further includes bypass lines 124 for bypassing compressed gas around the cooling elements. As described above in connection with the Goettel patent and the Cunkelman patent, the bypass lines 124 are used for bypassing compressed gas around the cooling elements and then mixing the bypassed gas with gas discharged from the cooling elements. The warmer bypassed gas increases the temperature of gas at the discharge of the cooling elements to prevent condensation and/or to prevent condensed liquid from freezing.

Oil-free air compressors are also known in the prior art. Oil free air compressors use cooling air from the cooling fan 118 to cool mechanical parts of the compressor 102, such as the crankshaft assembly and compression mechanism. An example of an oil-free air compressor, which may be modified to include the cooling unit of the present disclosure, is described in United States Patent Application Publication No. 2012/0192710 to Moore et al., which is incorporated by reference herein in its entirety. Another multistage oil-free air compressor is disclosed in United States Patent Application Publication No. 2015/0075369 to Kapadia et al., which is also incorporated by reference herein in its entirety.

Having described an oil-free air compressor as is known in the prior art, a multistage compressor having a cooling unit for cooling compressed air following compression stages will now be described in detail. The cooling unit described hereinafter and illustrated in FIG. 2 may include the same cooling fan used to provide cool air to the crankshaft assembly in the above-described embodiment of an oil-free compressor or may include separate cooling mechanisms dedicated for cooling the compressed gas.

Figure 2:
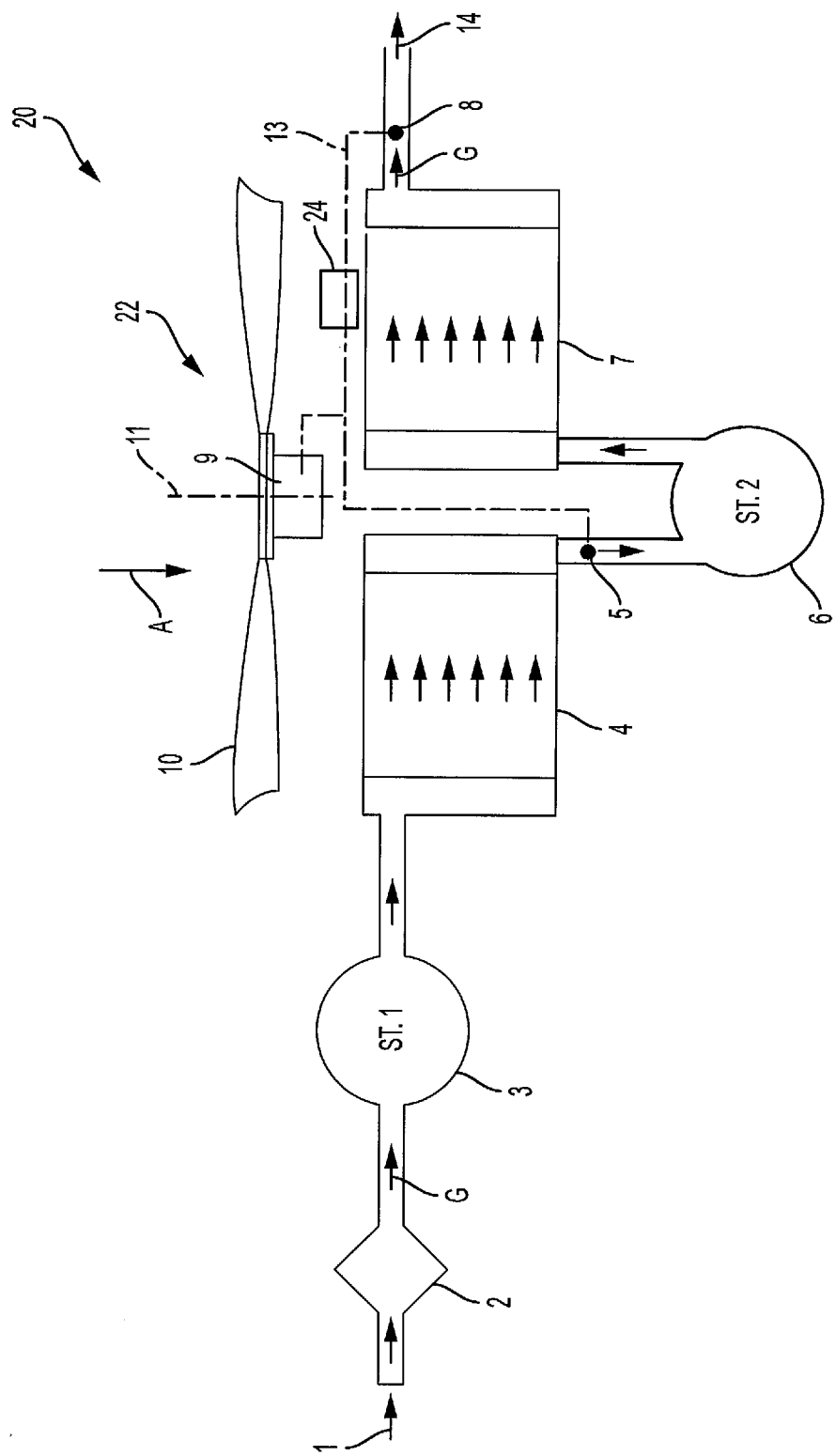
FIG. 2 is a schematic drawing of a multistage compressor and cooling unit according to one embodiment.

With reference to FIG. 2, an embodiment of a multistage compressor 20 is illustrated. The compressor 20 includes a thermostatically controlled cooling unit 22 to prevent water or other liquids from condensing within the compressor 20 between each stage of compression and to prevent condensed liquid from freezing following a final cooling stage. As will be described hereinafter, this is accomplished by controlling the temperature of the compressed gas between compression stages to a target temperature that prevents the water vapor pressure of the gas from exceeding the saturation vapor pressure for the compressed gas at a given temperature. The cooling unit 22 also prevents the temperature of the gas in the compressor 20 from exceeding a maximum optimal operating pressure. Furthermore, the cooling unit 22 is configured to maintain the temperature of compressed gas at the compressor discharge 14 above the freezing point of the condensed liquid.

Figure 2A:
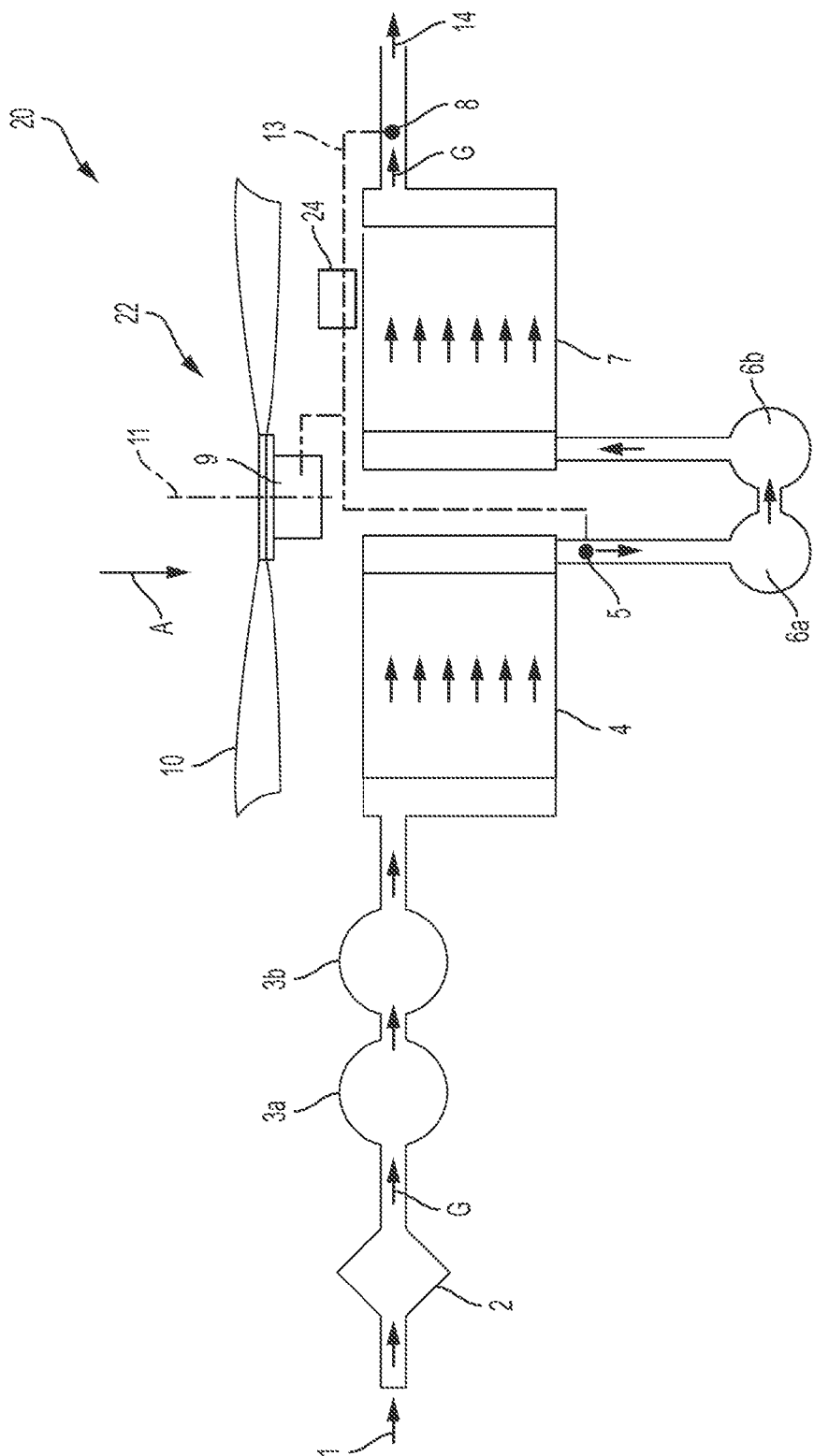
FIG. 2A is a schematic drawing of another embodiment of a multistage compressor and cooling unit.

The compressor 20 includes at least two compression stages, namely a first compression stage 3 and a second compression stage 6. The compression stages 3, 6 may include various compression mechanisms, such as a piston cylinder type, centrifugal type, axial-flow type, or turbine type mechanisms, as are known in the art. In certain embodiments, the multistage compressor 20 may also include any number of additional compression stages positioned before the first compression stage 3 or between the first compression stage 3 and the second compression stage 6 to provide additional compression of the gas as needed for different applications. Gas G, such as ambient air, is provided to the first compression stage 3 through a compressor inlet 1 and inlet filter 2. After the first compression stage 3, the compressed gas G is provided to a first cooling element, referred to hereinafter as an intercooler 4, positioned between the first compression stage 3 and the second compression stage 6. A second cooling element, referred to hereinafter as an aftercooler 7, is connected to a discharge portion of the second compression stage 6 for cooling the compressed gas following compression in the second compression stage 6. The intercooler 4 and aftercooler 7 may be radiators or heat exchangers, as are known in the art, for transferring heat from the compressed gas to the compressor housing or away from the compressor 20. An embodiment of the compressor 20 including additional compression stages is shown in FIG. 2A. As shown in FIG. 2A, the compressor 20 includes compression stages 3a, 3b positioned between the inlet filter 2 and the intercooler 4 and compression stages 6a, 6b positioned between the intercooler 4 and the aftercooler 7.

With continued reference to FIG. 2, the multistage compressor 20 further includes the cooling unit 22 having a cooling fan 10 for directing cooling air A toward the intercooler 4 and the aftercooler 7. As described above, the cooling fan 10 may be the same cooling fan that provides cooling air to the crankshaft assembly of an oil-free compressor, such as the oil-free compressor disclosed in the Moore publication. The cooling fan 10 may be coupled to and driven by a compressor crankshaft 11. The crankshaft 11 may be the same shaft that drives compression mechanisms of the compression stages 3, 6. Alternatively, the cooling fan 10 of the compressor cooling unit 22 may be a separate fan configured to direct cooling air A to the intercooler 4 and aftercooler 7. In certain alternative embodiments, separate cooling fans may be used to provide cooling air to the intercooler 4 and aftercooler 7.

The cooling unit 22 further includes at least one temperature sensor for measuring temperature of compressed gas in the compressor 20. In one embodiment, the sensor, referred to hereinafter as a first temperature sensor 5, is positioned to determine a temperature of gas G discharged from the intercooler 4. For example, the first temperature sensor 5 may be positioned at a discharge conduit that connects the intercooler 4 to the second compression stage 6. The cooling unit 22 may also include a second temperature sensor 8 that determines a temperature of gas G discharged from the aftercooler 7. For example, the second temperature sensor 8 may be positioned in discharge piping that connects the aftercooler 7 to the compressor discharge 14. While the temperature sensors 5, 8 are described hereinafter as being positioned at the discharge of the intercooler 4 and aftercooler 7, respectively, it is understood that the sensors 5, 8 may be placed at any location that has a temperature that is identical or proportional to the temperature of the gas G discharged from the respective cooling element. For example, the second sensor 8 may be positioned in the airstream for the compressor discharge 14 or in ambient air.

The temperature sensors 5, 8 may be any type of sensor suitable for measuring temperatures within ranges experienced within the respective discharge locations. In one embodiment, the sensors 5, 8 are binary switches that output a signal when a measured temperature exceeds a predetermined value, in the case of the first sensor 5, or drops below a predetermined value, in the case of the second sensor 8. Alternatively, the sensors 5, 8 may be more sophisticated electrical arrangements capable of measuring actual temperature values. For example, thermistors or thermocouples, as are known in the art, may be used for this purpose.

As shown in FIG. 2, the temperature sensors 5, 8 are connected to the cooling fan 10 via a signal line 13. A signal received from the sensors 5, 8 is used to control operation of the fan 10. More specifically, the cooling unit 22 is configured to increase or decrease a fan speed based on a temperature determined by the first temperature sensor 5 and/or the second temperature sensor 8. In certain embodiments, the cooling unit 22 is configured to decrease the fan speed when the first temperature sensor 5 determines that the temperature of the gas G at the discharge of the intercooler 4 is below a minimum optimal operating temperature, such as 165° F. The minimum optimal operating temperature should be sufficient to prevent the compressed and cooled gas from exceeding the saturation vapor pressure at the pressure and temperature achieved by the first compression stage 3. Thus, condensation in the compressor 20 is prevented. Furthermore, the cooling unit 22 may be configured to decrease the fan speed when the first sensor 5 determines that the temperature of the gas G at the discharge of the intercooler 4 is above a maximum optimal operating temperature, such as 400° F. This maximum optimal operating temperature is a maximum allowable for safe compressor operation. In certain embodiments, the maximum temperature may also be used as a maintenance warning or power knockdown switch, which activate when an elevated temperature is measured. It is further noted that the minimum and maximum optimal operating temperatures are based on operating parameters for the compressor 20 and may be adjusted for particular compressors or applications.

The cooling unit 22 may also be configured to decrease the fan speed when the second temperature sensor 8 determines that the temperature of the gas G at the discharge of the aftercooler 7 is below a temperature, such as between 32 and 40° F. The minimum temperature is sufficient to prevent condensed liquid from freezing and is dependent on the type of gas G being compressed by the compressor 20.

As will be appreciated by one having ordinary skill in the art, the cooling unit 22 may include various mechanical or electronic means for transferring a signal from the first temperature sensor 5 and/or the second temperature sensor 8 to the cooling fan 10, as well as for controlling the fan speed based on the received signal. For example, the cooling unit 22 may include an electronic controller 24, such as a microprocessor. The controller 24 may be adapted to execute various instructions for receiving a signal via the signal lines 13 connecting the first temperature sensor 5 and second temperature sensor 8, determining whether to increase or decrease the fan speed, and selectively issuing an instruction to modify the fan speed based on the determination. For example, the microcontroller may send an electrical signal to the fan to increase or reduce the fan speed. Alternatively, a pneumatic connection may be used that selectively engages or disengages the fan 10 from a rotating crankshaft 11 to increase or reduce rotation speed thereof.

In a preferred and non-limiting embodiment, as described above, the cooling fan 10 may be driven by the same compressor crankshaft 11 that drives compression mechanisms of the compression stages 3, 6. In that case, the fan 10 is coupled to the compressor crankshaft 11 via a clutch 9, which selectively engages and disengages the fan 10 from the crankshaft 11. The clutch 9 may be a mechanical clutch or a viscous style clutch depending on the type of compressor 20 and crankshaft 11 in the compressor 20. The cooling unit 22 may be configured to change the fan speed by engaging or disengaging the clutch 9 from the crankshaft 11. For example, an electric signal or a pneumatic control mechanism may be used for sending a signal from the controller 24 to the clutch 9. In many cases, rotation of the fan 10 does not entirely stop when the clutch 9 is disengaged from the crankshaft 11. Instead, in the disengaged position, the cooling fan 10 may rotate at a low or reduced speed, referred to hereinafter as a default speed, meaning that the cooling ability of the intercooler 4 and aftercooler 7 is reduced, but not entirely avoided when the clutch 9 is disengaged. When the clutch 9 is engaged the fan 10 operates at full speed, meaning that the fan 10 rotates at the same rate as the rotation of the compressor crankshaft 11. Since, when the fan 10 operates at full speed, more cooling air A is directed to the intercooler 4 and aftercooler 7, the cooling ability of these cooling elements is substantially increased.

Figure 3:
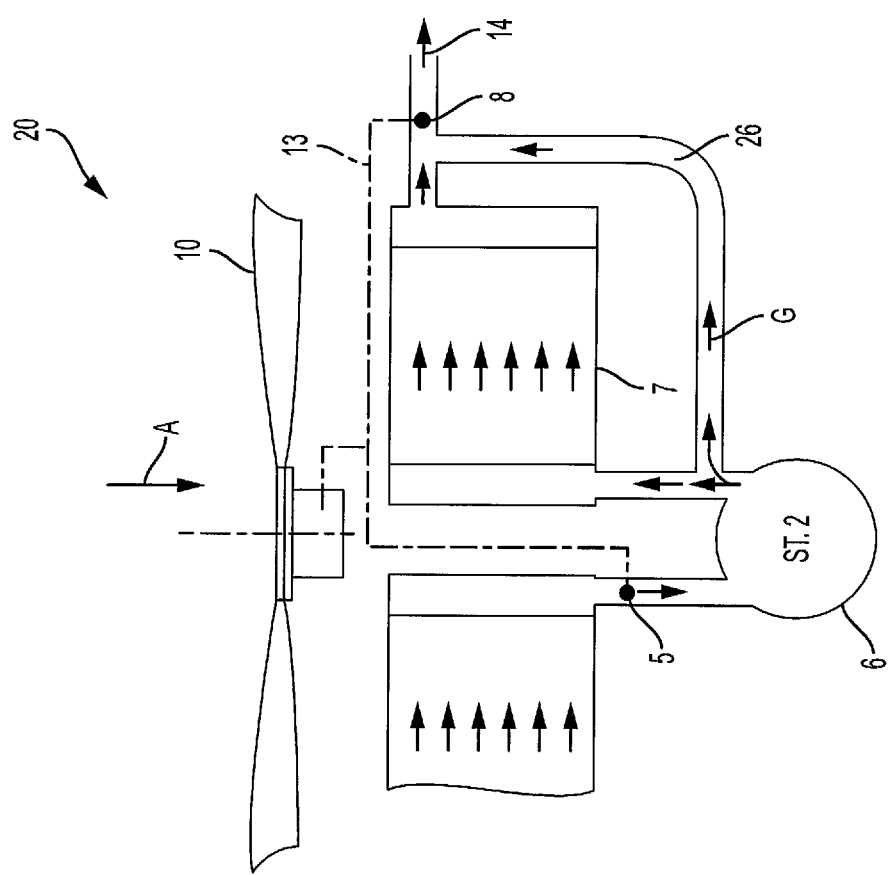
FIG 3 is a schematic drawing of a portion of a multistage compressor including an aftercooler bypass, according to another embodiment.

With reference to FIG. 3, when used in extreme cold temperatures, the multistage compressor 20 can also include a bypass arrangement with a bypass line 26 around the aftercooler 7. When a compressor 20 operates in extreme cold temperatures, the likelihood that condensed liquid collected at the aftercooler 7 discharge will freeze substantially increases. The bypass arrangement is an effective means for providing warm (e.g. uncooled) gas to counteract extreme cold of ambient air during operation in cold weather. An aftercooler bypass including a bypass line accessible through a three-way valve is described in the Goettel patent, which is discussed hereinabove. More specifically, in a bypass arrangement, a portion of the gas G compressed by the second compression stage 6 is transported around the aftercooler 7 by the bypass line 26. As described above, even when the cooling fan 10 operates at a default speed, the aftercooler 7 continues to provide some cooling affect for the gas G. Therefore, the gas G in the bypass line 26 is typically warmer than gas G that passes through the aftercooler 7. Therefore, as gas G from the bypass line 26 mixes with gas G discharged from the aftercooler 7 the bypass gas warms the gas from the aftercooler 7. Therefore, since the temperature of the gas G at the compressor discharge 14 is increased, condensed liquid from the compressed gas G is prevented from freezing.

With reference again to FIG. 2, in operation, gas G is drawn into the first compression stage 3 through the compressor inlet 1 and inlet filter 2. The gas G is compressed during the first compression stage 3 and then expelled via a fluid or discharge line to the intercooler 4. During start-up or initial operation, the compressor 20 is still relatively cold. Therefore, compressed gas G expelled from the intercooler 4 is typically below the minimum optimal operation temperature for the compressor 20, as measured by the first temperature sensor 5. In that case, the cooling unit 22 causes the cooling fan 10 to operate at the default or reduced speed meaning that less cooling air A is provided to the intercooler 4. By reducing the cooling air A provided to the intercooler 4, the temperature of the gas G increases to the minimum optimal operating temperature more quickly than if cooling air were provided to the intercooler 4. By reaching the optimal operating temperature quickly, the likelihood of water or fluid condensation is reduced.

Following the intercooling step, the gas G is provided to the second compression stage 6. During the second compression stage 6, pressure and temperature of the gas G is increased. The gas G is discharged from the second compression stage 6 and provided to the aftercooler 7. When the cooling fan 10 operates at the default or reduced speed, the aftercooler 7 does not substantially cool the compressed gas G. Once, the compressed gas G is discharged from the aftercooler 7, the temperature of the discharged gas G is measured by the second temperature sensor 8. The compressor 20 continues to operate with the cooling fan 10 at the default or reduced speed until the first temperature sensor 5 determines that the temperature of gas G discharged from the intercooler 4 is within the optimal operating range. When the first temperature sensor 5 determines that the optimal operating range is reached, the cooling fan 10 speed is increased. For example, the clutch 9 may be engaged so that the fan 10 rotates at the rotation speed of the crankshaft 11.

The compressor 20 continues to operate with the fan 10 at increased or full speed until either the first temperature sensor 5 determines that the temperature of gas G at the intercooler 4 discharge is below a minimum optimal operating temperature or the second temperature sensor 8 (positioned at the aftercooler 7 discharge) determines that the temperature of the discharged gas G is below a desired minimum temperature. When the temperature is below the minimum temperature, the fan speed is reduced. For example, the clutch 9 may be disengaged. Reducing the fan speed reduces the effectiveness of the intercooler 4 and aftercooler 7 allowing gas G passing through the compressor 20 to increase in temperature and, specifically, increasing the temperature of the gas G at the compressor discharge 14 to prevent condensed liquid from freezing. The process of selectively increasing or reducing the fan speed, such as by engaging and disengaging the clutch 9, may be repeated during operation of the compressor 20 thereby ensuring that the gas G within the compressor 20 remains within the optimal operating temperature range for the compressor 20 and preventing damage to the compressor caused by condensed liquid between compression stages 3, 6 and freezing of condensed liquid at the compressor discharge 14.

While specific embodiments of the multistage compressor and method of controlling fan speed have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. Further, although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A multistage compressor comprising:
   a first compression stage for compressing air to compressed air;
   a second compression stage connected in series with the first compression stage that receives and further compresses the compressed air from the first stage;
   a first cooling element connected between the first compression stage and the second compression stage for cooling the compressed air following compression in the first stage;
   a second cooling element connected to a discharge of the second compression stage for cooling the compressed air following compression in the second compression stage; and
   a cooling unit comprising:
      a fan configured to provide cooling air to at least one of the first cooling element and the second cooling element;
      a first temperature sensor that determines a temperature of the compressed air discharged from the first cooling element;
      a second temperature sensor that determines a temperature of the compressed air at a discharge of the second cooling element; and
      a controller that receives temperature values from the first temperature sensor and from the second temperature sensor and controls a speed of the fan based on the received temperature values,
      wherein controlling the speed of the fan comprises increasing the speed of the fan when the temperature value of the first temperature sensor is greater than a minimum optimal operating temperature sufficient to prevent water vapor pressure of the compressed air between the first compression stage and the second compression stage from exceeding saturation vapor pressure for the compressed air at a given temperature, and decreasing the speed of the fan when the temperature value measured by the second temperature sensor is below a minimum discharge temperature sufficient to prevent fluid condensed within the compressor from freezing.

2. The compressor of claim 1, wherein controlling the fan speed further comprises maintaining an increased fan speed when the temperature value of the first temperature sensor is greater than the minimum operating temperature, and decreasing the speed of the fan when the received temperature value from the first temperature sensor drops below the minimum optimal operating temperature.

3. The compressor of claim 1, wherein the minimum optimal operating temperature is at least 165° F.

4. The compressor of claim 1, wherein the minimum discharge temperature is between 32° F. and 40° F.

5. The compressor of claim 1, further comprising at least one additional compression chamber connected between an air inlet and the first compression stage for providing additional compression stages for the compressed air.

6. The compressor of claim 1, wherein the controller is a microprocessor comprising instructions for receiving the temperature values from the first temperature sensor and the second temperature sensor, determining whether to increase or decrease the speed of the fan, and selectively issuing an instruction to modify the speed of the fan based on the determination.

7. The compressor of claim 1, wherein each compression stage comprises a compression chamber having a mechanism for air compression contained therein.

8. The compressor of claim 7, further comprising a crankshaft coupled to the mechanism of the first compression stage and the second compression stage.

9. The compressor of claim 8, wherein the fan of the cooling unit is also driven by the crankshaft.

10. The compressor of claim 8, wherein the fan comprises a clutch for coupling the fan to the crankshaft and wherein the cooling unit is configured to engage or disengage the clutch based on the temperature determined by the first temperature sensor.

11. The compressor of claim 10, wherein the clutch is electrically controlled or pneumatically controlled.

12. The compressor of claim 10, wherein the clutch is a viscous clutch.

13. A multistage compressor comprising:
a first compression stage for compressing air to compressed air;
a second compression stage connected in series with the first compression stage that receives and further compresses the compressed air from the first stage;
a first cooling element connected between the first compression stage and the second compression stage for cooling the compressed air following compression in the first stage;
a second cooling element connected to a discharge of the second compression stage for cooling the compressed air following compression in the second compression stage; and
a cooling unit comprising:
a fan configured to provide cooling air to the first cooling element or the second cooling element;
a first temperature sensor that determines a temperature of the compressed air discharged from the first cooling element;
wherein the cooling unit is configured to increase a fan speed when a temperature determined by the first temperature sensor is greater than a minimum optimal operating temperature sufficient to prevent water vapor pressure of the compressed air between the first compression stage and the second compression stage from exceeding saturation vapor pressure for the compressed air at a given temperature and decrease the fan speed when the temperature determined by the first temperature sensor drops below the minimum optimal operating temperature, and
wherein the compressor further comprises a bypass line connected to the discharge of the first compression stage or the second compression stage, and adapted to pass the compressed air around the first cooling element or the second cooling element.

14. The compressor of claim 13, wherein the bypass line is adapted to mix bypassed air with cooled compressed air from the first cooling element or the second cooling element to increase the temperature of the cooled compressed air at the discharge of the first cooling element or the second cooling element.

15. The compressor of claim 1, wherein the first temperature sensor comprises a binary switch, a thermistor, or a thermocouple.

16. A method for controlling fan speed of a cooling fan of a compressor comprising:
providing air to a first compression stage of a multistage compressor to produce compressed air;
providing the compressed air to a first cooling element;
determining a discharge temperature of the compressed air after the compressed air passes through the first cooling element;
providing the compressed air from the first cooling element to a second compression stage that further compresses the compressed air;
providing the compressed air from the second compression stage to a second cooling element;
determining the discharge temperature of the compressed air after the second cooling element;
using a cooling unit comprising a cooling fan disposed between the first compression stage and the second compression stage to provide cooling air to the first cooling element or the second cooling element; and
controlling the cooling fan to control a temperature of the compressed air between the first compression stage and the second compression stage by increasing a speed of the fan when the determined discharge temperature for the first cooling element is greater than a minimum optimal operating temperature sufficient to prevent water vapor pressure of the compressed air from exceeding saturation vapor pressure for the compressed air at a given temperature and reducing the speed of the cooling fan when the discharge temperature of the compressed air at the discharge of the second cooling element is below a minimum discharge temperature sufficient to prevent fluid condensed within the compressor from freezing.

17. The method of claim 16, wherein controlling the temperature of the compressed air between the first compression stage and the second compression stage further comprises reducing the speed of the fan when the discharge temperature of the compressed air at a discharge of the first cooling element is below the minimum optimal operating temperature.

18. The method of claim 16, wherein the minimum optimal operating temperature is at least 165° F.

19. The method of claim 16, wherein the minimum discharge temperature sufficient to prevent fluid condensed within the compressor from freezing is between 32° F. and 40° F.

20. The compressor of claim 1, wherein the minimum optimal operating temperature is sufficient to prevent both the water vapor pressure of the compressed air from exceeding the saturation vapor pressure for the compressed air and to prevent freezing of condensation from the compressed air discharged from the second cooling element.

21. The compressor of claim 13, wherein the minimum optimal operating temperature is sufficient to prevent both the water vapor pressure of the compressed air from exceeding the saturation vapor pressure for the compressed air and to prevent freezing of condensation from the compressed air discharged from the second cooling element.

22. The method of claim 16, wherein the minimum optimal operating temperature is sufficient to prevent both water vapor pressure of the compressed air from exceeding saturation vapor pressure for the compressed air at a given temperature and to prevent freezing of condensation from the compressed air discharged from the second cooling element.

* * * * *

UNITED STATES PATENT AND TRADEMARK OFFICE
CERTIFICATE OF CORRECTION

PATENT NO. : 9,951,763 B2
APPLICATION NO. : 14/704586
DATED : April 24, 2018
INVENTOR(S) : Jeffrey Hritz It is certified that error appears in the above-identified patent and that said Letters Patent is hereby corrected as shown below:

In the Claims

In Claim 1, Column 10, Line 23, insert --compression-- before "stage"
In Claim 1, Column 10, Line 45, delete "received", add --that are received-- after "values"
In Claim 2, Column 10, Line 59, delete "fan", insert --of the fan-- after "speed"
In Claim 2, Column 10, Line 62, delete "the", insert --a-- before "minimum"
In Claim 2, Column 10, Line 63, delete "received"
In Claim 13, Column 11, Line 37, insert --compression-- before "stage"
In Claim 13, Column 11, Line 41, insert --compression-- before "stage"
In Claim 14, Column 12, Line 4, delete "cooled", insert --that is cooled-- before "at"
In Claim 16, Column 12, Line 32, insert --cooling-- before "fan"
In Claim 16, Column 12, Line 32, delete "determined"
In Claim 16, Column 12, Line 32, insert --that is determined-- before "for"
In Claim 16, Column 12, Line 39, delete "the", insert --a-- before "discharge"
In Claim 17, Column 12, Line 46, insert --cooling-- before "fan"

Signed and Sealed this
Ninth Day of August, 2022

Katherine Kelly Vidal
*Director of the United States Patent and Trademark Office*